March 29, 1932.  B. DE MATTIA  1,851,570
VULCANIZING MOLD
Filed June 27, 1927  4 Sheets-Sheet 1

Inventor
Bartolo De Mattia
by
Rogers Kennedy Campbell Attys.

March 29, 1932.  B. DE MATTIA  1,851,570
VULCANIZING MOLD
Filed June 27, 1927  4 Sheets-Sheet 2

Inventor
Bartoed De Mattia
by Rogers Kennedy Campbell
Attys.

March 29, 1932. B. DE MATTIA 1,851,570
VULCANIZING MOLD
Filed June 27, 1927 4 Sheets-Sheet 3

Inventor
Bartolo De Mattia
by Rogers Kennedy Campbell
Att'ys

March 29, 1932.  B. DE MATTIA  1,851,570
VULCANIZING MOLD
Filed June 27, 1927  4 Sheets-Sheet 4

Inventor
Bartolo De Mattia
by
Rogers, Kennedy Campbell
Attys.

Patented Mar. 29, 1932

1,851,570

UNITED STATES PATENT OFFICE

BARTHOLD DE MATTIA, OF CLIFTON, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MOLD

Application filed June 27, 1927. Serial No. 201,905.

This invention relates to molds for vulcanizing automobile tires, inner tubes, and the like, and is directed to an improved locking means for holding the mold sections together during vulcanization.

In the vulcanization of tires, inner tubes, and the like, it is customary to inflate the articles to properly maintain them in contact with the walls of the mold cavities, and in order to resist this internal pressure, it is necessary to firmly lock the mold sections in closed relation. Numerous ways and means have been employed for effecting such locking of the mold sections, one of the most desirable forms including means for quickly actuating the locking mechanism. Some of the prior art molds of the above mentioned character are provided with a locking member in the form of a ring which is rotatably supported on one of the mold sections and which has locking lugs adapted to engage portions of the mold sections adjacent their peripheries. The mold sections are non-rotatably mounted on suitable supports capable of movement toward and away from each other, and they are secured to the supports at points spaced inwardly substantial distances from the outer edges of the mold sections. Thus the mold sections are anchored at or near their centers, while the locking means, such as locking rings, are supported by the outer edges of the mold sections at substantial distances from the anchorage points.

The present invention contemplates an improved structure, an important feature of which is the provision of a vulcanizing mold of the so-called book type which will be more rugged and more securely mounted than the prior art molds. More specifically the invention contemplates the provision of a vulcanizing mold wherein the mold sections are rotatably mounted with reference to a stationary frame, a portion of which is of annular form for encircling the mold sections when closed, and said encircling portion is provided with certain spaced locking lugs adapted to firmly maintain the mold sections in closed relationship during vulcanization. One of the mold sections is rotatably maintained in a fixed plane in the rigid frame, while the other mold section is rotatably mounted in the free end of a swinging support which permits movement of that mold section toward and away from the other mold section to open and close the mold when unlocked, and the sections are rotatable as a unit about a common axis when the mold is closed.

Another feature of the invention is the provision of simplified mechanism for quickly rotating the mold sections to locked or unlocked position. In the illustrated embodiments of the invention, such mechanism includes a fluid pressure cylinder and a cooperating piston, suitably connected to the mold section which is permanently but rotatably associated with the stationary frame. Dowel pins or other suitable means are provided to connect the two mold sections for simultaneous rotation as a unit when the mold is closed, said dowel pins also functioning to bring the tread designs of both mold sections into proper registration with each other. If desired, the piston rod may be so proportioned as to compensate for the differences in power required for the locking and unlocking strokes of the piston.

Another feature of the invention is the provision of a vulcanizing mold which will be extremely simple in construction, strong and durable in service, efficient in use, and a substantial advance in the art.

Referring now to the drawings, wherein the various features of the invention have been shown by way of illustration, Fig. 1 is a front elevation of one form of vulcanizing mold embodying the invention;

The improved mold illustrated in Figs. 1 to 5 inclusive, is of the so-called "book type" for the vulcanization of automobile tires and includes a pair of opposed mold sections 10 and 11, which in this particular embodiment are shown as disposed in a substantially vertical plane, although of course, they could be otherwise arranged if desired. The mold sections 10 and 11 are respectively provided with mold cavities 12 and 13 (best shown in Fig. 4) for the accommodation of a tire which is supported in the usual manner by a two part rim 14. The walls of the mold cavities are suitably recessed as at 15 to provide opposed seats for the snug reception of the rim 14 whereby to completely encase the tire supported thereon, and in the use of the device, the tire is pressed against the walls of the mold cavities 12 and 13 by the inflation of the usual air-bag (not shown) within the tire. The mold sections 10 and 11 are further provided with heating chambers 16 for the circulation of steam or other heating fluid, by means of which the vulcanization is effected.

Figure 2:
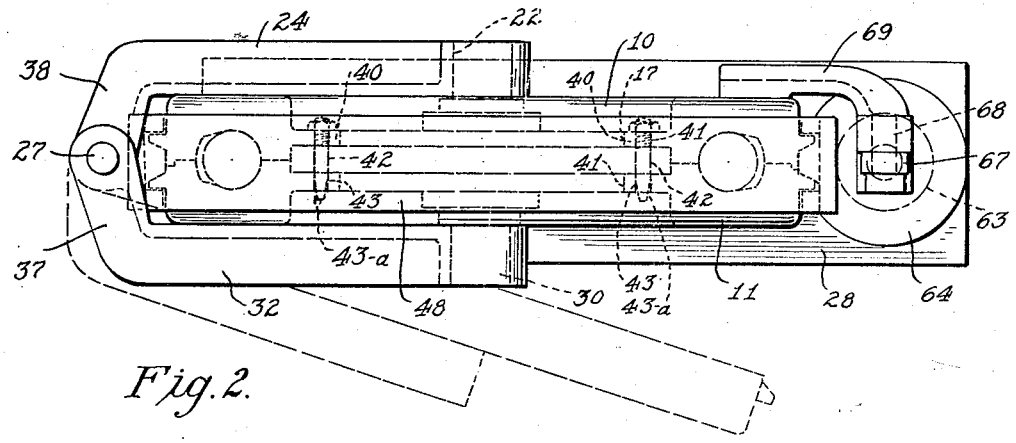
Fig. 2 is a top plan view thereof.

At their inner peripheries, the mold sections 10 and 11 are provided with annular flanges 17 and 18 to which mounting plates 19 and 20 are respectively secured by means of bolts 21. The mounting plate 19 is provided with a substantially central stub shaft or journal 22 which is rotatable in a bearing at 23 in the meeting ends of a pair of converging arms 24 and 25, said arms extending laterally with reference to the mold and being anchored at 26 on a supporting post 27. The post 27 extends upwardly from a main base 28 which, in the drawings, has been illustrated as formed from conventional structural steel elements. The supporting plate 20 for the mold section 11 is similarly provided with a stub shaft or journal 30 which is rotatable in a bearing at 31 in the meeting ends of a pair of converging arms 32 and 33, the other ends of which are pivotally mounted at 34 on the post 27. By way of reinforcement, the arms 32 and 33 may be firmly connected by a cross bar 35, and preferably these parts will be integrally formed in a single casting. As best shown in Fig. 2, the supporting post 27 is substantially in the plane of the meeting faces of the mold, and the arms 24, 25, 32, and 33 are accordingly formed with off-set portions 37 and 38, which provide the connections at 26 and 34 to the post 27, whereby the two mold sections are hinged with reference to each other. The mold section 10 is rotatable about the axis of the shaft 22, but is fixed with reference to the post 27 and therefore cannot swing, while the mold section 11 is not only rotatable about the axis of the shaft 30, which is in axial alignment with the shaft 22, but is capable of being swung toward and away from the mold section 10 in order to close and open the mold, respectively such swinging movement being possible by virtue of the supporting arms 32 and 33 being pivoted on, rather than fixed to, the upright post 27.

The annular flanges 17 and 18 of the two mold sections are respectively provided with diametrically opposed lugs 40 and 41, and anchored in each of the lugs 40 is a forwardly extending dowel pin or stud 42. The lugs 41 are provided with apertures 43, through which the outer ends of the studs 42 are adapted to extend when the mold is closed, in such a manner as to bring the mold sections into proper registration with each other, and to connect said mold sections for rotation as a unit about their common axis. In order to provide the necessary clearance to permit the swinging of the mold section 11, the extremities of the studs 42 are tapered at 43a, as best shown in Fig. 2.

It is necessary to provide means for locking the two mold sections in closed relationship in order to resist the internal pressure during the vulcanizing operation, and for this purpose the mold sections 10 and 11 are provided on their outer peripheries with a plurality of spaced lugs 44 and 45 which are adapted for clamping engagement between a flange 46 and cooperating lugs 47, extending inwardly at the side edges of an annular portion 48 of the stationary frame. The said annular portion 48 encircles the mold sections 10 and 11 and is held rigid by bolts 49 which secure it to a pair of standards 50 extending upwardly from the main base 28. To assist in the support of the mold sections and to relieve the arms 24, 25, 32 and 33 of excessive strain, the frame portions 48 is provided at opposite sides of the vertical center and below the horizontal center with bearings 51, in which are mounted rollers 52 (Figs. 3 and 5), said roller bearings being so disposed as to avoid interference with the swinging of the mold section 11 in its opening and closing movements.

Figure 1:
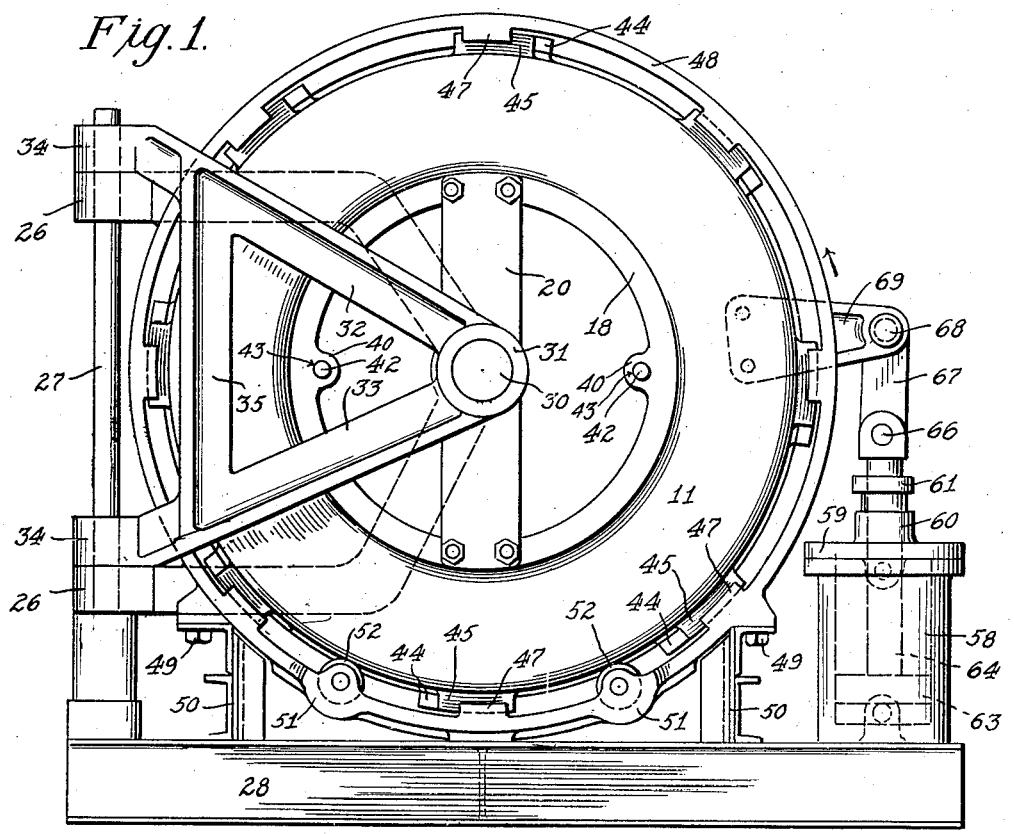
Figure 3:
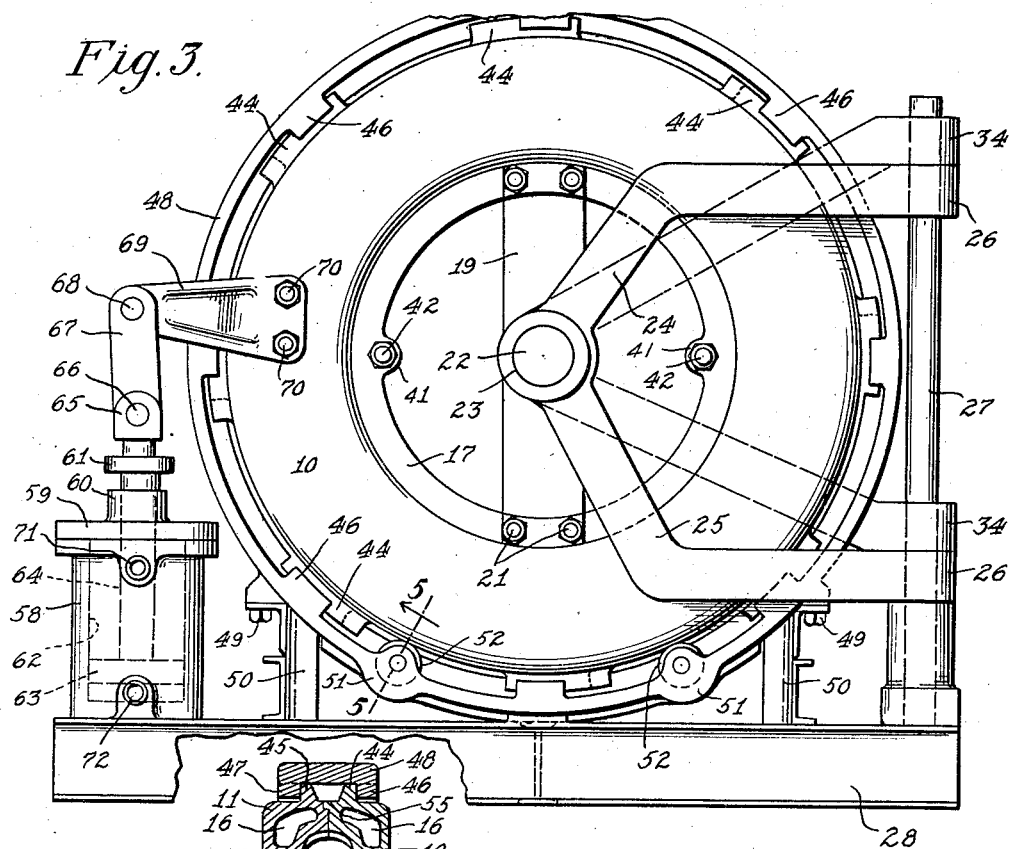
Fig. 3 is a rear elevation of the mold.
Figure 4:
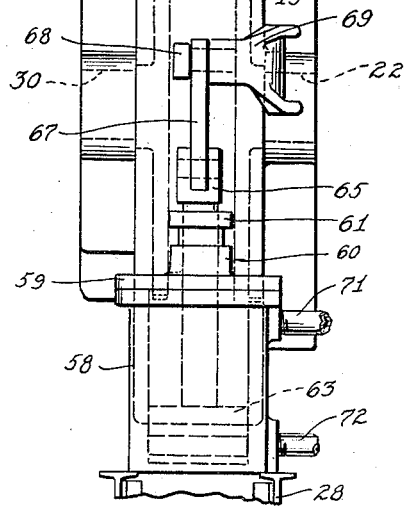
Fig. 4 is an edge view, partly in section, of the improved mold and actuating mechanism.
Figure 5:
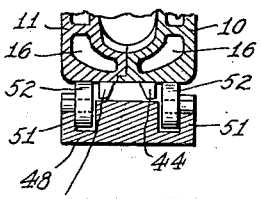
Fig. 5 is a fragmentary transverse sectional view taken on line 5—5 of Fig. 3.

From the foregoing, it will be evident that when the mold is closed and locked, as shown in Figs. 1, 3 and 4, it will be firmly held against the internal pressure during the vulcanizing operation by virtue of the engagement of the locking lugs 44, 45, 47, and flange 46; and further, that the mold will be very firmly supported upon the base because of the fact that the annulus 48 is a rigid portion of the frame. To open the mold, it is merely necessary to rotate the mold sections as a unit about the coincident axes 22 and 30 in a counter-clockwise direction as viewed in Fig. 1, until the locking lugs 47 of the frame portion 48 become disengaged from the lugs 45 of the mold section 11, whereupon the said mold section 11 can be swung outwardly from the section 10 to permit the removal of the vulcanized tire and the insertion of an unvulcanized tire. The cooperating faces of the lugs 45 and 47 are bevelled or inclined in such a manner as to provide a cam action whereby the mold sections 10 and 11 will be forcibly drawn together in their final rotation to locked position. In place of the lugs 44, above described, the mold section 10 may have a continuous flange to engage the inner side of the flange 46, said flange on mold section 10 being formed with transverse grooves to clear the lugs 47 when assembling said mold section 10 in the annulus 48.

Any desired mechanical means may be employed for rotating the mold sections with reference to the stationary frame, and for this purpose, in Figs. 1 to 4, inclusive, a pressure cylinder has been illustrated. The pressure cylinder 58 is anchored on the main base 28 and has its lower end closed and its upper end fitted with a cylinder head 59 having a stuffing box 60 and a packing gland 61. Within the bore 62 of the cylinder 58 is a piston 63 secured to a piston rod 64 which reciprocates through the stuffing box 60 and gland 61. The outer end of the piston rod 64 is provided with a bifurcated enlargement 65 to which is pivotally connected at 66 the lower end of a link or pitman 67. The upper end of the link 67 is pivotally connected at 68 to the outer end of arm 69 which is secured to the mold section 10 by means of bolts 70, and which extends radially from said mold section to a point outside of the locking ring 48. A pressure fluid, such as steam, compressed air, or water, is admitted to the cylinder 58 at opposite sides of the piston 63 through ports 71 and 72, the arrangement being such that the fluid pressure against the lower side of the piston 63 will force the piston upwardly within the cylinder 58, rotating the mold sections to unlocked position, while the fluid pressure acting against the upper side of the piston 63 will force said piston downwardly and result in rotation of the mold sections to their locked position. In order to regulate the admission and exhaust of the pressure fluid through the ports 71 and 72, any ordinary valve mechanism may be employed, said valves not being illustrated in the drawings since specific arrangements will be obvious to those skilled in the art.

After a tire has been vulcanized considerable power is required to open the mold, due to the fact that the tire tends to adhere to the walls of the mold cavities. This condition is met in the arrangement above described by reason of the greater power transmitted by the piston 63 in the unlocking movement, the leverage being greatest and the piston area larger during such movement.

In the use of the apparatus, assuming that a vulcanizing operation has just been completed, the mold can be easily opened by admitting the pressure fluid through the port 72, forcing the piston 63 upwardly, which straight line movement will be transmitted to the mold section 10, through the link 67 and arm 69, causing said mold section to rotate. As the mold section 10 rotates, the section 11 will move with it because of the pin connections at 42, and when the piston 63 has reached the upper limit of its movement, the lugs 47 will have become disengaged from the lugs 45, whereupon the operator can swing the mold section 11 away from the section 10, giving access to the interior of the mold. After the vulcanized tire has been removed and another unvulcanized tire placed within the mold cavity 12, the section 11 can again be swung in to engage the section 10 and therafter the rotation of the mold sections can be effected by the admission of pressure fluid through the port 71 to force the piston 63 downwardly. It is possible with the above described apparatus to provide a single machine frame and operating mechanism which will accommodate interchangeable mold sections for molds of different sizes and varying tread designs. The frame portion 48 and lugs 45 of the mold sections will then necessarily be of standardized dimensions, commensurate with the largest size tire mold, while the internal flanges 17 and 18 are commensurate with the corresponding dimensions of the smallest size mold sections adapted for interchange in the frame.

Figure 6:
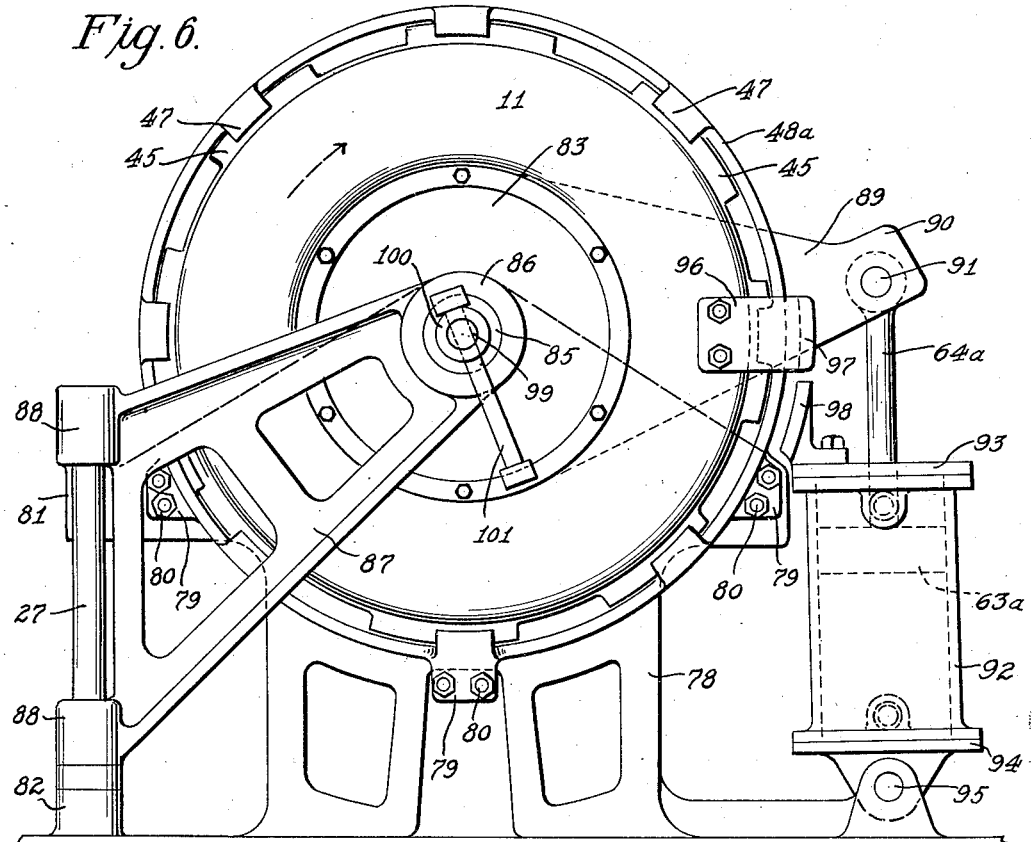
Fig. 6 is a front elevation of another form of mold, and supporting and actuating mechanism therefor.
Figure 7:
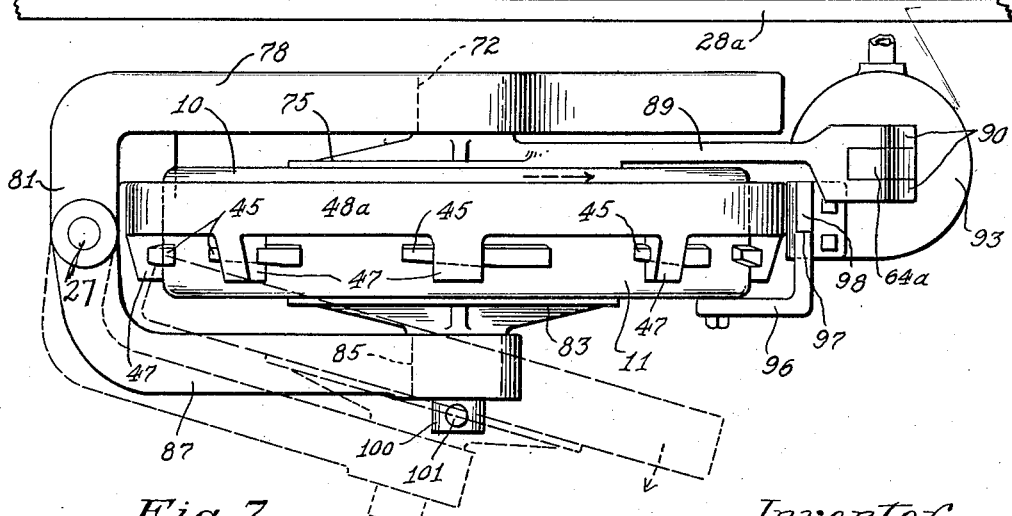
Fig. 7 is a top plan view of the device illustrated in Fig. 6.
Figure 8:
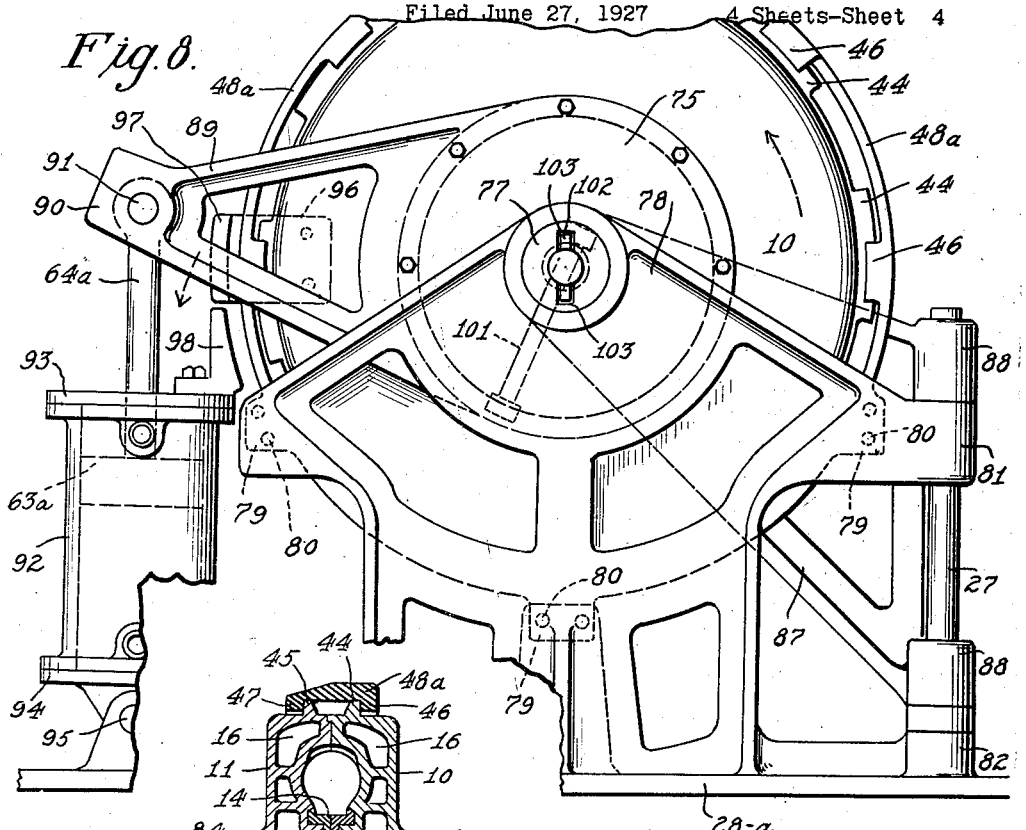
Fig. 8 is a rear elevation of the same partly broken away.

Referring now to Figs. 6 to 9, inclusive, a modified form of the invention will be described. In this form of the invention, the mold sections 10 and 11 and their lugs 44 and 45 are similar to those in the first form, and the annular frame portion 48$^a$ is narrower than the first described locking portion 48 and has its locking lugs 47 formed in the nature of extensions from the body of said locking portion, as best shown in Fig. 7. Instead of the crossbar 19, the mold section 10 in this form is provided with a substantially circular mounting disk 75 secured by bolts 76 to the outerside of the mold section 10, said mounting disk being provided with a shaft or journal 77 by means of which the mold section 10 is rotatably supported in the upper end of a stationary upright frame member or pedestal 78. The encircling frame portion 48$^a$ is provided with a plurality of ears 79, through which anchoring bolts 80 are passed to secure the ring to the stationary frame member 78, which is also provided at one of its sides with a pair of bosses 81 and 82 in which the upright post 27 is secured. The mold section 11 is similarly mounted on a disk 83 which is secured thereto by bolts 84, said disk having a central shaft or journal 85 in axial alignment with the shaft 77, and which is journaled at 86 in the upper end of a hinged member 87, said member 87 being povoted at 88 on the post 27.

The mounting disk 75 for the mold section 10 is provided with a radial arm 89 which extends beyond the locking ring 48ª and has its outer bifurcated end 90 pivotally connected to the upper end of a piston rod 64ª, as at 91. The lower end of the rod 64ª carries a piston 63ª which is reciprocable within a pressure cylinder 92 having an upper cylinder head 93 through which the rod 64ª passes, and a lower cylinder head 94 which is pivoted at 95 to the base 28ª. In order to initially break the mold open in the unlocking stroke, the mold section 11 is provided with an extension 96, having an inclined cam edge 97, which is adapted to cooperate with a cam 98 secured to the upper side of the cylinder head 93. Thus as the mold sections are moved in a clockwise direction, as viewed in Fig. 6, through the instrumentality of the piston 63ª, the cam 97 engages the cam 98, resulting in the forcible separation of the mold sections, and it is to be noted that the cams 97 and 98 are diametrically opposed to the hinge connection of the mold sections, whereby substantial leverage is obtained for the breaking action.

Figure 9:
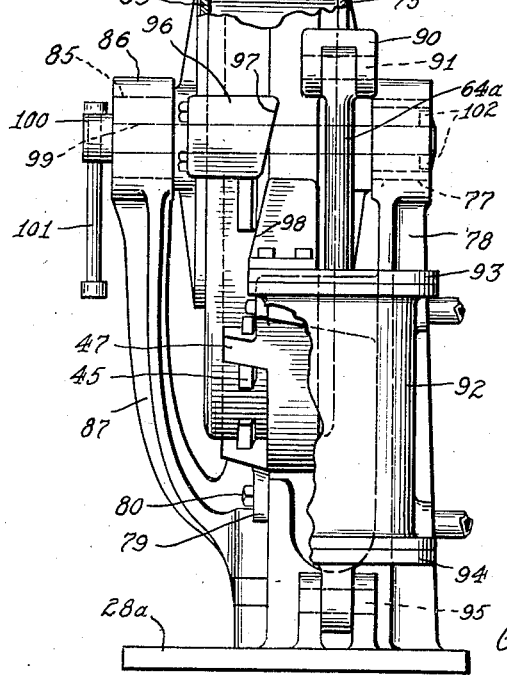
Fig. 9 is an edge view of the same with parts broken away and parts in section.

The illustrated modification of the invention also includes a variation in the means for connecting the mold sections together for rotation as a unit. For this purpose the shafts 77 and 85 of the mold mounting disks 75 and 83 are provided with central longitudinal bores through which a clamping rod 99 extends, said rod being longitudinally slidable within said bores, and being keyed or splined to the shaft 85. The front end of the rod 99 preferably extends beyond the end of the shaft 85 and is provided with a collar 100 in which is transversely disposed, as best shown in Figs. 6 and 9, a handle 101 by which the rod may be actuated. The opposite end of the rod 99 is provided with transversely extending pins 102, which are adapted to be received in diametrically opposed longitudinal grooves or keyways 103 in the shaft 77. When the mold is closed, as shown in Fig. 9, and the rod 99 pushed in as far as possible, the respective tread designs of the mold sections 10 and 11 will be properly alined and the two mold sections will be keyed together for simultaneously rotation. After the mold sections have been rotated to their unlocked position as previously explained, the rod 99 may be longitudinally drawn outwardly until the pins 102 are entirely out of the grooves 103, whereupon the swinging mold section 11 may be moved away from the non-swinging section 10.

It will be obvious that other means may be employed in place of the pressure cylinder to rotate the mold sections to their locked and unlocked positions. For example, a segmental gear or rack and pinion similar to that disclosed in the prior application of Peter de Mattia bearing the Serial No. 146,324, filed November 5, 1926, may be applied to one of the mold sections and to the stationary frame, and equipped with means whereby the same may be manually operated, and such substitution of various mechanical means will readily present themselves to those skilled in the art.

From the foregoing it will be evident that I have provided an improved vulcanizing mold wherein the mold sections are supported very firmly during the vulcanizing operation and wherein the frame of the machine is of extremely simple and rugged construction. The invention is, of course, susceptible of numerous modifications other than those specifically disclosed herein, and the right is herein reserved to make such changes as fall within the scope of the appended claims without departing from the spirit of the invention.

Having thus described my invention, what I claim is:

1. A vulcanizing mold comprising a pair of opposed mold sections provided with a plurality of locking lugs adjacent their peripheries, stationarily hingedly connected supports for the mold sections, said mold sections being rotatably mounted on their said respective supports, a stationary frame including an annular portion encircling the mold sections when they are in closed relation, said annular portion having locking lugs adapted for cooperation with those of the mold sections, means connecting the mold sections for rotation as a unit, and mechanism for imparting rotary movement to one of the mold sections.

2. A vulcanizing mold including a pair of opposed mold sections, stationarily hingedly connected supports upon which said mold sections are rotatably mounted, a stationary annular frame encircling the mold sections, locking means mounted in part upon the annular frame, means for rotating the mold sections in unison within the frame, and means on said stationary annular frame for assisting in the support of the mold sections.

3. A vulcanizing mold including a pair of opposed mold sections disposed in a vertical plane, a stationary frame in the form of an annulus encircling the mold sections when closed, said annulus and mold sections having cooperating lugs to hold the mold closed during the vulcanization, stationarily hingedly connected supports in which portions of the mold sections are journaled, roller bearings associated with the stationary annulus for assisting in the support of the mold sections, said roller bearings being disposed at opposite sides of the vertical center and below the horizontal center of the mold, and means for rotating the mold sections to locked or unlocked positions.

4. A vulcanizing mold including a pair of opposed mold sections having independent coaxial journals, stationarily hingedly connected arms having at their free ends bearings for the reception of said journals, a stationary frame, locking means mounted in part upon the mold sections and in part upon the frame, means for connecting the mold sections together for simultaneous rotation, a radial arm secured to one of the mold sections, and fluid-pressure means for applying power to said radial arm whereby to rotate the mold sections to engage and disengage said locking means.

5. A vulcanizing mold including a pair of opposed mold sections having independent coaxial journals, stationarily hingedly connected arms having at their free ends bearings for the reception of said journals, a stationary frame, locking means mounted in part upon the mold sections and in part upon the frame, means for connecting the mold sections together for simultaneous rotation, a radial arm secured to one of the mold sections, fluid-pressure means for moving said arm to rotate the mold sections, and means for drawing the mold sections together as they are rotated to locked position.

6. A vulcanizing mold comprising a pair of opposed mold sections provided with a plurality of locking lugs adjacent their peripheries, stationarily hingedly connected supports for the mold sections, said mold sections being rotatably mounted on their said respective supports, a stationary frame having spaced locking lugs adapted to be engaged by the lugs on the mold sections when they are in closed relation, means connecting the mold sections for rotation as a unit, and means for imparting rotary movement to one of the mold sections.

7. A vulcanizing mold comprising a pair of opposed mold sections provided with a plurality of locking lugs adjacent their peripheries, stationarily hingedly connected supports for the mold sections, said mold sections being rotatably mounted on their said respective supports, a stationary frame having spaced locking lugs adapted to be engaged by the lugs on the mold sections when they are in closed relation, the engaging faces of the lugs being bevelled whereby to draw the mold sections together as they are rotated to locked position, means connecting the mold sections for rotation as a unit, and means for imparting rotary movement to one of the mold sections.

8. A vulcanizing mold comprising a pair of opposed mold sections provided with a plurality of locking lugs adjacent their peripheries, stationarily hingedly connected supports for the mold sections, said mold sections being rotatably mounted on their said respective supports, a stationary frame having spaced locking lugs adapted to be engaged by the lugs on the mold sections when they are in closed relation, the engaging faces of the lugs being bevelled whereby to draw the mold sections together as they are rotated to locked position, means connecting the mold sections for rotation as a unit, and means including a fluid pressure cylinder and piston for rotating the connected mold sections to locked and unlocking positions.

9. A vulcanizing mold comprising a pair of opposed mold sections provided with a plurality of locking lugs adjacent their peripheries, stationarily hingedly connected supports for the mold sections, said mold sections being rotatably mounted on their said respective supports, a stationary frame having spaced locking lugs adapted to be engaged by the lugs on the mold sections when they are in closed relation, the engaging faces of the lugs being bevelled whereby to draw the mold sections together as they are rotated to locked position, means connecting the mold sections for rotation as a unit, and means including a fluid pressure cylinder and piston for rotating the connected mold sections to locked and unlocked positions, a breaking cam carried by one of the mold sections at a point diametrically opposed to the hinge connection, and a cooperating member supported by the cylinder but in the path of the breaking cam whereby to force the mold sections apart during the unlocking rotary movement.

In testimony whereof I have affixed my signature hereto.

BARTHOLD DE MATTIA.